United States Patent
König

[19]

[11] Patent Number: 6,160,825
[45] Date of Patent: Dec. 12, 2000

[54] METHOD AND SYSTEM TO CALIBRATE TUNABLE LASERS

[75] Inventor: Jens König, Bremen, Germany

[73] Assignee: Zarm-Technik GmbH, Germany

[21] Appl. No.: 09/314,520

[22] Filed: May 19, 1999

[51] Int. Cl.[7] ........................................................ H01S 3/10

[52] U.S. Cl. .................................. 372/20; 372/32; 372/33

[58] Field of Search .................................. 372/20, 32, 33, 372/29

[56] References Cited

U.S. PATENT DOCUMENTS

| | | | |
|---|---|---|---|
| 4,823,354 | 4/1989 | Znotins et al. | 372/57 |
| 5,390,203 | 2/1995 | Miller | 372/29 |
| 5,657,340 | 8/1997 | Campado et al. | 372/32 |

FOREIGN PATENT DOCUMENTS

| | | | |
|---|---|---|---|
| 06334253 | 2/1994 | Japan | H01S 3/13 |
| 6-334253 | 12/1994 | Japan . | |

OTHER PUBLICATIONS

Demtroder, Wolfgang, Laser Spectroscopy, Springer–Verlag, NY 1981.

Lachish, Uri, Tunable Diode Laser Based Spectroscopic System . . . , Rev. Sci. Instrum. 58(6), Jun. 1987, pp. 923–927.

Gill, P., A. Microprocessor–Controlled Iodine _Stabilised Laser, J. Phys. E: Sci. Instrum. 21 (1988), pp. 213–218.

*Primary Examiner*—Leon Scott, Jr.
*Attorney, Agent, or Firm*—Technoprop Colton LLC

[57] ABSTRACT

An automatic personal computer-based, rapid calibration system for tunable, narrowband lasers is achieved, detecting the LIF (Laser Induced Fluorescence) spectrum of a suitable known medium in a reference cell, which is also stored as a database in the PC to compute a functional relationship between the wavelength-shifting actuator in the laser and the emitted laser wavelength. The PC is either connected to the LIF spectrum-detecting circuit and the laser interface. Substances (media) used for reference have to exhibit at least two distinct electronic absorption lines within the tunability range of the laser. By comparing the measured and the stored LIF spectrum of the reference medium, the spectral properties of the laser are calculated automatically.

25 Claims, 1 Drawing Sheet

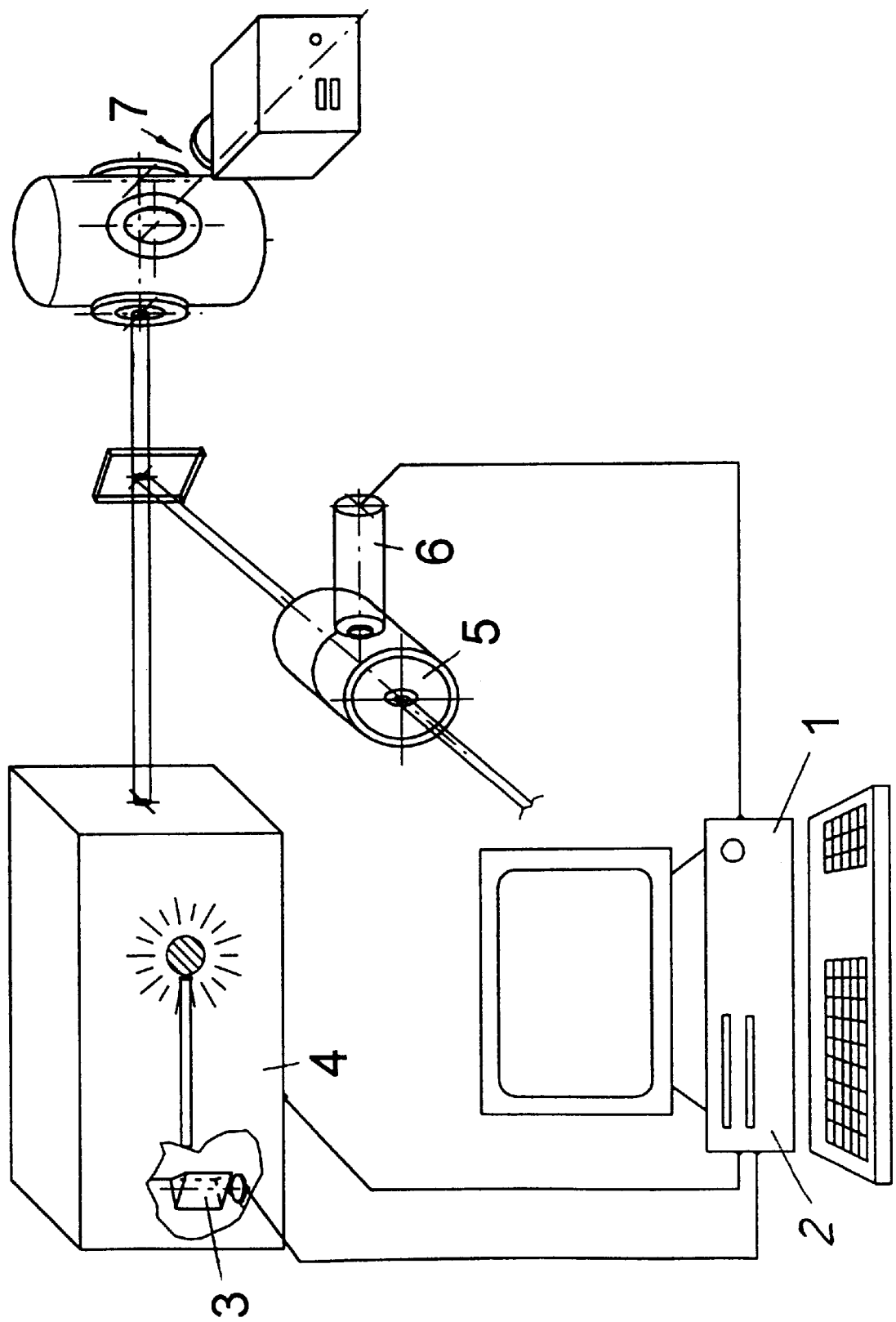

METHOD AND SYSTEM TO CALIBRATE TUNABLE LASERS

SPECIFICATION

Laser-based diagnostics play an increasingly important role in the scientific study of flows, especially in those containing reacting media or species were a sensitive and selective probing with high temporal and spatial resolution is very difficult and intrusive. Moreover, laser diagnostics is becoming increasingly important in surveying and controlling technical processes, such as in combustors or chemical reactors.

The quality of the measured data obtained by laser diagnostics requires precise knowledge and calibration of the conditions of electronic excitation, i.e. the spectral properties of the excitation laser source, For most gas-, dye- or solid state lasers used, the parameters of operation (e.g. pulse repetition rate, discharge voltage etc.) Can be adjusted reproducibly. The actual spectral properties of the emitted laser light, however, strongly depend on the adjustment of the optical and mechanical parts in the laser and in addition have to be determined and controlled by suitable external means.

When using lasers for selective diagnostics, such as laser induced fluorescence (LIF), one feature of prime importance is a precise adjustment of the laser wavelengths. Because in particular for tunable lasers of high output power, part of the emitted energy is absorbed within the optics of the resonator, thus yielding a change of mechanical adjustment and a shift from the desired wavelength due to thermomechanical deformation. For the sake of reproducible and precise results of the diagnostic applied, the emission wavelength and bandwidths of the laser source employed have to be checked frequently and properly.

Prior Art

Exciter lasers are pulsed-gas lasers of high output, which typically emit in the UV-Range (352 nm–308 nm, 248 nm, 193 nm depending on the medium used). For each of the selected wavelengths the emitted laser light has a spectral width of 1 to 2 nm. Using an optical resonator with spectral-dispersing parts, a selected wavelength of very small bandwidth within this spectral range can be amplified. Thus the laser operates "narrow-banded" and typically emits light of only a few picometers in spectral width. By adjusting the spectrally selective parts in the laser by suitable (mostly mechanical) means, the emitted laser wavelengths can typically be shifted continuously within the range of resonance of the laser medium.

A very prominent application of such narrowband, tunable lasers is the excitation of single electronic transition of selected, mostly small molecules or radicals, which in return fluoresce and can be selectively detected. To obtain reproducible results, the properties of the emitted laser light, in particular the wavelengths, must be known and identical for individual measurements. Theoretically, the spectral adjustment of the laser source can be done by scanning the fluorescence response of the species to be detected in the experiment versus the laser wavelength within the tunable range of the laser source. To achieve this, the process in the test chamber must be controlled in such a way that the concentration of the species to be detected is high enough and constant throughout the entire scanning and no additional, possibly crosstalking signal from other species interferes with the result. Especially for measurements in critical environments, a calibration procedure is required that can be operated independently of the experiment on which the diagnostics are applied.

The prior art for the spectral calibration and control of tunable laser sources with respect to wavelength and bandwidth is as follows.

Spectrograph

The attenuated laser light is optically passed into a spectrograph and spectrally dispersed. The intensity of the inserted laser light can be displayed as a function of wavelength. By exploiting the data, the center-emission wavelengths of the laser source and the halfwidth's full maximum HWFM can be determined. Disadvantages are High Cost of Equipment Time required to adjust and calibrate the spectrograph (which is almost as sensible to handle as the laser source to be controlled) to the experimental setup.

The calibration by means of a spectrograph requires a user who is highly qualified and familiar with the equipment being used.

Etalon

By means of an etalon, only the bandwidth, but not the wave length of a laser light source can be determined by interpreting the pattern (distance) of interference fringes.

An etalon is cheap, but provides no information on the emission wavelength of a laser source.

Calibration with an Electronic Reference Scheme

Especially it the species to be observed in a technical process or experiment is not present in a constant or sufficient concentration for calibration, or the process can not be driven for a period long enough for a calibration procedure, an external source, which provides the identical species used in the process to be probed, can be used as a reference. For example, investigating the concentration of OH-radicals by means of LIF, for example by exciting a selected rotational line in the well known $A^+\Sigma \rightarrow X\Pi$ transition, a stabilized burner can be used to record a calibration spectrum by continuously shifting the excitation wavelength within the tunable range of the laser source. By comparing the obtained spectrum with data available in the literature, the desired transition line can be selected, and the respective laser wavelength can be adjusted manually. Since making a quick change of the detection system from the experimental to the calibration setup is difficult or impossible, this method requires a complete separate experimental setup in most applications. To achieve a precise spectrum, a quasi-steady signal from the reaction zone in a reference flame is required, making it necessary to average by means of numerous shots at each wavelength, which results in an extended calibration procedure. Moreover, in many cases, a two-dimensional intensified, and thus expensive, detection system is needed to identify the area of interest. Because part of the typical laser sources used for diagnostics exhibits a relatively strong shift in the emission wavelength, a frequent and short calibration procedure is essential for obtaining good experimental results.

A stop towards an acceptable calibration method in the sense mentioned above is the use of a reference cell, containing a medium containing a sufficient and constant concentration of a substance which exhibits a distinct electronic transition spectrum within the tunable range of the laser source to be calibrated. This cell can serve as a calibration source separately from the experiment and can be kept much more simple with a one-dimensional detector.

SUMMARY OF THE INVENTION

The invention is a fast, fully automatic and autonomous calibration system for tunable, in particular narrowband laser sources. It comprises the use of a reference-cell, filled with a medium that shows a suitable, distinct LIF-electronic excitation spectrum, a UV-detector and personal computer with interfaces which enable the control of either the laser and detector at the reference-cell. The spectral resolution of the calibration is basically limited by the properties of the electronic transition spectrum due to the molecules or atoms used in the reference cell. The method can be applied to all lasers and laser sources which are tunable (in wavelength) by use of an electrical or mechanical mean, either pulsed or cw.

The advantage of the present invention over the prior art is that the calibration system can be used even by a user unskilled in the field of spectroscopy to calibrate a laser automatically and precisely. Furthermore, the installation of the reference cell in the optical beam is simple and typically only a small portion of the output laser energy used by the system. Compared to the prior art, the calibration procedure is very fast and can be used for both scientific and industrial applications.

The present invention includes a method to calibrate a tunable, in particular narrowband laser, said loser having a variable wavelength within in adjustable range, automatically to any desired wavelength by using a host computer and a specific software governing the automatic operation of the parts as follows.

- a laser which is tunable in wavelength and in particular spectrally narrowbanded, with the tunability being achieved by mechanically or electrically moving a part of the refractive optics within the optical path of the resonator, or by electrically or mechanically changing the optical properties of a nonlinear crystal within the optical path of the resonator, the said laser with pulsed or continues (cw) output being part of the method in the sense that it is the apparatus to be calibrated;
- a reference cell containing a volume of a specific substance, which can be either gaseous, liquid or solid, said substance being chosen to have a distinct fluorescence emission spectrum within the tunable range of the laser to be tuned;
- means (e.g. actuator) to shift reproducibly the wavelength of the laser within the tunable range continuously or preferably in discrete increments, the means being driven by an electrical or mechanical signal;
- a photon detector, having an optical sensitivity in the spectral range of the fluorescence emitted by the substance used in the reference cell which is electronically excited by the laser to be tuned; the said detector having a known ratio of electrical output signal to the incoming light (photons) within the spectral range used;
- interfaces which are suitable for ensuring that the host computer operates the said actuator in the laser to shift the wavelength, to trigger the laser as well as to read a photon detector within a timing regime suitable for a parallel operation (readout and gating) of the photon detector with respect to the laser pulses;
- the said host computer and software record a fluorescence emission spectrum of the substance contained in the reference cell by driving said actuator, trigger said laser source and read the signal of the photon detector for each respective position of said actuator, automatically run by a routine in the software;
- said computer and software handling either the recorded as well as the stored data with software for the purpose of computing a functional relationship between laser output wavelength and all respective positions of the said actuator within the laser that shifts the laser wavelength,
- said computer and software handling fluorescence emission spectra from substances other than used for reference calibration and stored in a databank so that every characteristic feature of those spectra can be directly chosen with respect to wavelength, and said laser can be immediately adjusted to this wavelength,

BRIEF DESCRIPTION OF THE DRAWING

The FIGURE illustrates an automatic and autonomous calibration system for a tunable laser.

DESCRIPTION OF THE PREFERRED EMBODIMENT

The invented method bases upon the automatic recording and exploitation of a LIF-Spectrum in a reference-cell, filled with a reference medium that exhibits at least two distinct excitation lines of detectable and exploitable strength within its excitation band in a part, or the entire tunable range of the laser source to be calibrated.

The UV spectrum of the substance used as reference in the tunable range of the laser-source is stored in the host PC databank. By comparing the spectrum detected in the reference cell, with that stored in the databank by means of the pattern and strength of the maxima, a functional relationship between excitation wavelength and position of the driver unit (actuator) tuning the output wavelength of the laser source is computed. By generating this functional relationship, every desired laser wavelength in the tunable range can be chosen and adjusted. By loading the fluorescence emission spectra of other substances, e.g. molecules, radicals or atoms, into the databank, a direct and instant choice of a transition line of a species other than the reference substance can be made.

By using a reference substance which exhibits a high fluorescence yield, and furthermore by using a sensitive, typically one dimensional detector (photon multiplier, photon diode, etc.) a distinguishing feature of the invented method is that only part of the output energy of the laser light is required for the calibration procedure. Thus, the measurement setup with the reference cell can be left installed using e.g. a partially reflecting mirror mounted in the optical path from laser to the object to be diagnosed, whose setup does not have to be changed.

Another distinguishing feature of the present method is that by comparing the spectrum detected in the reference-cell with that of identical substance at known excitation conditions stored in the databank, the actual spectral properties of the laser source (HWFM, ratio of narrowband emission to amplified spontaneous (broadband) emission etc.) can be computed at once after the reference scan is completed.

The system components are depicted in FIG. 1 and described below. A personal computer (host PC) "1" drives by means of suitable software "2" via an interface connection to the laser an actuator "3", moving the wavelength tuner (e.g. optical grid, nonlinear optical crystal) which is mounted within the optical path of the resonator. In parallel fashion, the PC provides an in/out signal to the laser "4". For pulsed lasers, the host PC triggers the laser synchronizing the gating and readout of the detector (photon multiplier, LTV diode etc.) "5" mounted at the reference-cell "6". In return, the signal of the detector is supplied to the host PC, electronically processed and stored. The reference cell is filled with a medium that exhibits a distinct electronic transition within the tunable range of the laser. Assigning the fluorescence yield measured for each single pulse to the respective position of the wavelength-shifting actuator in the laser, the obtained spectrum covering a part or the entire tuning range of the laser can be used for further computation.

The software incorporates a catalog of LIF spectra for at least the medium used in the reference cell with precise wavelength positions assigned to the electronic excitation structure.

"1", personal computer, incorporates the functions and interfaces to drive and control the laser, suitable at least to trigger laser pulses with a timing accurate enough to match the gating and readout of the detector. Furthermore, the PC drives the actuator unit in the wavelength tuning means in discrete steps.

If more than one actuator is used to shift the wavelength of the light emitted by the laser, additional interfaces are mounted in the PC to drive and control those units.

The PC is equipped with an interface to control the gating and readout of the detector mounted at the reference-cell to record the yielding LIF-signal. All processes receiving or sending data and signals via the interfaces are governed by the specific software "2".

"2", software enables the user to operate the system via a desktop interface as well as through the automatic process of laser calibration by driving the parts connected to the interfaces as described above. The essential objective of the software is to process the recorded data in order to provide a partial or entire set of the following features and data:

Storage and assignment of data.

Computation of a functional relationship between the position of the actuator shifting the wavelength "3", and the wavelength obtained from the obtained LIF reference spectrum of the reference substance and the LIF-spectrum of an identical substance stored in the databank.

Assignment of this functional relationship to the LIF excitation spectra of other species stored in the databank.

Direct selection and adjustment of specific LIF excitation lines following the LIF-spectra stored in the databank.

Automatic exploitation of the spectral laser performance with respect to HWFM did ratio of narrowband/amplified spontaneous emission (ASE) within the tunable range by comparing the LIF spectrum recorded from a reference substance to that stored in the databank.

"3", actuator to shift the laser-wavelength within the tunable range is inherently a part of the automatic calibration system and part of the laser as well. Preferably the actuator moves in reproducible steps, with a stepwidth that shifts an increment of wavelength considerably smaller than the HWFM of the emitted narrowband laser emission.

"4", each narrowband tunable laser source which incorporates one or more parts that can be driven electrically or mechanically (actuator) to shift the wavelength reproducibly is suitable for calibration by the system described in the present document.

"5", reference cell contains the substance which exhibits a distinct LIF excitation spectrum within the tunable range of the laser and has an optical access for both the laser and the photon detector, which is preferably mounted perpendicular to the accessed laser light. The LIF spectrum of the said substance has to be precisely known in the literature with respect to the intensity wavelength (wavenumber) profile. The substance can either be solid, liquid or gaseous and is preferably pure or diluted in another substance showing no electronic excitation within the tunable range of the laser source. If the reference medium shows a considerable electronic excitation in the tunable range only under conditions of elevated temperature (e.g. to increase the population of a higher electronic ground state level) and/or pressure (e.g. to increase the species density), the reference-cell can be open or closed and is optionally equipped with a heater or designed as a pressure vessel.

"6", photon detector, has a known sensitivity within the spectral range of the laser-induced-fluorescence signal of the substance used for reference and electronically excited by the laser source to be calibrated. The electrical output signal has to be proportional to the detected LIF-signal by a known functional relationship. The preferably zero-dimensional detector may be substituted by a one- or two-dimensional intensified camera equipment. To avoid or attenuate undesirable signals e.g. from elastic scattering (Rayleigh or Nie) overlapping the LIF, optical filters can be applied to the photon detector.

Preferred lasers for the invention are:

The calibration of ArF exciter lasers (193 nm) by means of a reference cell filled with diluent gas (e.g. nitrogen) and oxygen. To achieve an electronic excitation spectrum with rotational line of small half-widths, the reference cell is optionally cooled and the total pressure reduced.

The calibration of KrF exciter lasers (247–248 nm) by means of a reference cell filled with diluent gas (e.g. nitrogen) and oxygen. To achieve a sufficiently high population of the electronic ground state of oxygen the reference cell is heated to a temperature above 850 Kelvin.

The calibration of XeF exciter lasers (352–353 nm) by means of a reference cell filled with diluent gas (e.g. nitrogen) and formaldehyde. To achieve a sufficiently high density of formaldehyde in the gas phase, the reference cell can be heated as an option.

What is claimed is:

1. A method for calibrating a tunable laser which emits a laser beam, said laser having a laser wavelength settable within a tuning range, the method comprising the steps of:

a. providing a reference cell containing a reference medium having a fluorescence spectrum at least partially in the tuning range of the laser;

b. providing a photon detector for detecting the fluorescence spectrum of said reference cell and for converting the fluorescence spectrum into an electric signal; and c. providing a control unit for accessing an actuator for setting the laser wavelength of the laser to be calibrated and for accessing the electric signal of the photon detector, wherein at least part of the laser beam emitted by the laser to be calibrated is directed into the reference cell containing the reference medium thereby exciting the reference medium into fluorescence, detecting the fluorescence spectrum of the reference medium with the photon detector, converting the detected fluorescence spectrum of the reference medium into the electric signal with the photon detector, inputting the electric signal into the control unit, and accessing the actuator for setting the laser wavelength based on the electric signal.

2. The method according to claim 1, characterized in that the control unit comprises a recorded reference spectrum, and the method further comprising the steps of comparing the recorded reference spectrum in the control unit in the tuning range of the laser with the fluorescence spectrum of the reference medium located in the reference cell, and making a functional correlation between a manipulated variable for setting the laser wavelength and the wavelength emitted by the laser.

3. The method according to claim 1, characterized in that the control unit comprises recorded reference spectra, and the method further comprising the steps of making automatic calculations comparing the fluorescence spectrum of the reference medium detected in the reference cell to the recorded reference spectra, followed by making a direct adjustment of the laser to user selected characteristics of the recorded reference spectra.

4. The method according to claim 3, wherein the recorded reference spectra comprises the known fluorescence spectrum of the reference medium in the reference cell and the spectral characteristics of the laser at the time of calibration in the tuning range of the laser are calculated by comparing the fluorescence spectrum of the reference medium detected in the reference cell with the known fluorescence spectrum of the reference medium located in the reference cell in the tuning range of the laser.

5. The method according to claim 1, characterized in that the reference medium has in the tuning range of the laser to be calibrated at least two distinguishable fluorescence excitation lines exhibiting a sufficient sensitivity for measurement in the spectral region of the fluorescence spectrum of the reference medium.

6. The method according to claim 1, wherein the reference medium has substantially constant concentration and electronic stimulation properties for the calibration of one or more laser.

7. The method according to claim 1, wherein the reference cell is designed to maintain a substantially constant concentration and substantially constant electronic stimulation properties of the reference medium for the calibration of one or more laser, and to ensure optical entrances for the admission of the laser light and for the fluorescence spectra detected in the reference cell.

8. The method according to claim 7, characterized in that the reference medium is heated.

9. The method according to claim 7, characterized in that the reference medium is cooled.

10. The method according to claim 7, characterized in that each electric signal is adapted to the detector, read by the control unit and processed by same.

11. The method according to claim 7, characterized in that the photon detector is selected from the group consisting of zero-dimensional sensors, one-dimensional sensors, and two-dimensional sensors.

12. The method according to claim 1, wherein the reference cell accommodating the reference medium is connected to a sensitive photon detector capable of recording the intensity of the fluorescence signals by means of a known function of a proportional electric output signal.

13. The method according to claim 1, characterized in that cooled oxygen is used as the reference medium for calibrating lasers in the range from 193 nm to 420 nm by means of fluorescence line stimulation.

14. The method according to claim 13, characterized in that the oxygen is present in a specific concentration in a diluent gas.

15. The method according to claim 14, characterized in that inert gas is employed as the diluent gas.

16. The method according to claim 1, characterized in that warmed oxygen is used as the reference medium for calibrating lasers in the range from 193 nm to 420 nm by means of fluorescence line stimulation.

17. The method according to claim 16, characterized in that the oxygen is present in a specific concentration in a diluent gas.

18. The method according to claim 17, characterized in that inert gas is employed as the diluent gas.

19. The method according to claim 1, wherein said laser is a narrowband laser.

20. A system for calibrating a tunable laser which emits a laser beam, said laser beam having a laser wavelength settable within a tuning range, the system comprising:
   a. a reference cell into which at least a part of the laser beam is directed, the reference cell containing a reference medium, the reference medium having a fluorescence spectrum at least partially in the tuning range of the laser;
   b. a photon detector which detects the fluorescence spectrum and which converts the fluorescence spectrum into an electric signal; and
   c. a control unit which receives the electric signal and which accesses an actuator for tuning the laser to a wavelength within the tuning range of the laser based on the electric signal.

21. The system according to claim 20, wherein the control unit further comprises one or more recorded reference spectra.

22. The system according to claim 20, wherein the reference medium has in the tuning range of the laser to be calibrated at least two distinguishable fluorescence excitation lines exhibiting a sufficient sensitivity for measurement in the spectral region of the fluorescence spectrum of the reference medium.

23. The system according to claim 20, wherein the reference medium has substantially constant concentration and electronic stimulation properties for the calibration of one or more laser.

24. The system according to claim 20, wherein the reference medium is oxygen present in an inert diluent gas.

25. The system according to claim 20, wherein the photon detector is selected from the group consisting of zero-dimensional sensors, one-dimensional sensors, and two-dimensional sensors.

* * * * *